United States Patent [19]

Kosuda et al.

[11] 4,339,021
[45] Jul. 13, 1982

[54] CARBON FIBER REINFORCED CARBON FRICTION ELEMENT AND METHOD OF MAKING

[75] Inventors: Hiroyuki Kosuda, Numazu; Kenji Niijima, Shizuoka, both of Japan

[73] Assignee: Toho Beslon Co., Ltd., Tokyo, Japan

[21] Appl. No.: 170,221

[22] Filed: Jul. 18, 1980

[30] Foreign Application Priority Data

Jul. 18, 1979 [JP] Japan .................................. 54/90325

[51] Int. Cl.³ .......................... B32B 5/02; C23C 9/06; B44D 1/46; F16D 13/60
[52] U.S. Cl. ...................................... 191/50; 428/408; 428/366; 428/367; 428/368; 428/902; 428/218; 428/689; 428/697; 428/699; 264/29.2; 427/228; 427/379; 427/126.1; 188/251 A; 192/107 M; 423/448
[58] Field of Search ............... 428/408, 689, 366, 368, 428/697, 367, 699; 427/228, 379; 264/29.5

[56] References Cited

U.S. PATENT DOCUMENTS

| | | | |
|---|---|---|---|
| 2,868,672 | 1/1959 | Johnson et al. | 428/408 X |
| 3,206,327 | 9/1965 | Diefendorf | 428/408 |
| 3,672,936 | 6/1972 | Ehrenreich | 427/379 X |
| 3,700,535 | 10/1972 | McCoy et al. | 428/367 |
| 3,970,174 | 7/1976 | Kirkhart | 264/29.5 |
| 4,029,829 | 5/1977 | Weaver et al. | 428/408 X |

FOREIGN PATENT DOCUMENTS 1415853 11/1975 United Kingdom .

*Primary Examiner*—P. Ives
*Attorney, Agent, or Firm*—Sughrue, Mion, Zinn, Macpeak and Seas

[57] ABSTRACT

A friction material comprising a carbon fiber reinforced carbon with an oxidation temperature of at least 800° C. and a crystallinity index of matrix carbon of from 2.3 to 5.0, a process for the production of the same, and a friction element comprising the same.

29 Claims, 2 Drawing Figures

CARBON FIBER REINFORCED CARBON FRICTION ELEMENT AND METHOD OF MAKING

BACKGROUND OF THE INVENTION

1. Field of the Invention

This invention relates to a friction material comprising carbon fiber reinforced carbon (hereinafter referred to as "CFRC") which has an oxidation temperature of at least about 800° C. and a crystallinity index R of the matrix of from about 2.3–5.0, a process for the production thereof, and friction elements using said CFRC.

2. Description of the Prior Art

CFRC has increasingly been attracting attention as a material for use in various friction materials, particularly in brakes of aircrafts, because of its light weight and good friction characteristics. For the production of such CFRC friction material, the following methods are known:

(a) A carbon fiber is impregnated with a carbonizable resin, molded and carbonized, and the procedure of impregnation and carbonization is repeated to increase the density of the CFRC;

(b) Pyrolysis carbon is deposited on a carbon fiber by a chemical vapor deposition method (cf. SAMPE 16th National Symposium and Exhibition p 257; April, 1971) and (c) A carbon fiber is impregnated with a carbonizable resin, molded and carbonized and thereafter the density of the CFRC is increased by a chemical vapor deposition method.

With conventional friction materials, particularly aircraft brake materials comprising CFRC, it has been considered to be preferred that while conducting the steps of method (a), (b) or (c), or between the two steps in said methods, or after the completion of the steps thereof, the CFRC is subjected to at least one heat-treatment at a high temperature, generally a temperature of at least 2,500° C., to effect the graphitization of matrix carbon; see U.S. Pat. No. 3,970,174 (corresponding to Japanese Patent Application (OPI) No. 101770/1975). This is because high graphitization of carbon leads to a reduction in abrasion loss during braking, which is desirable for a brake material.

Such graphitization, however, gives rise to the problems that production costs are increased since the heat-treatment of CFRC at the high temperature as described above is required for the graphitization and CFRC is softened, resulting in a decrease in strength and stiffness. However, conventionally if the CFRC is not graphitized, the abrasion loss of the brake material during the braking increases, which is not desirable for the brake material.

SUMMARY OF THE INVENTION

An object of this invention is to provide a useful friction material, a process for the production thereof, and a friction element comprising said friction material.

Another object of this invention is to provide a friction material which exhibits small abrasion loss at high temperatures when used as a brake, has sufficiently high friction characteristics, a process for the production thereof, and a friction element using said material.

The friction material of this invention is a carbon fiber reinforced carbon friction material which has an R value, that is, crystallinity index of matrix carbon, of from about 2.3 to 5.0 and contains an antioxidant in such an amount that the oxidation temperature is at least about 800° C.

The production of CFRC includes a step where matrix carbon is heat-treated at a temperatures as to provide an R value of the matrix carbon of from about 2.3 to 5.0, and a step of incorporation of an antioxidant therein in such an amount that the oxidation temperature is at least about 800° C., during the production of CFRC or after the completion thereof.

The friction material of this invention can be used as a material for a friction element, such as a brake or a pantograph of a train.

DETAILED DESCRIPTION OF THE INVENTION

In this invention a carbon fiber is used as a reinforcing fiber. The carbon fiber is a fiber obtained by carbonizing and/or graphitizing, in general, at a temperature range of from about 1,000°–3,000° C. Carbon fibers produced at various temperatures may be used in a combination in an optional volume ratio. These fibers can be used in the form of chopped fiber, filament yarn, spun yarn, roving, woven fabric, knit fabric, felt, nonwoven fabric or the like. While the diameter of the fiber is not critical, it is usually from about $5\mu$ to $20\mu$.

The fiber content of CFRC is preferably from about 20 vol% to 65 vol%, particularly from about 25 vol% to 50 vol%.

By the term "matrix carbon" as used herein is meant the carbon portion of the CFRC other than the reinforcing fiber.

The crystallinity index R and oxidation temperature $T_o$ as used in this invention are defined as follows:

CRYSTALLINITY INDEX R

Figure 1:
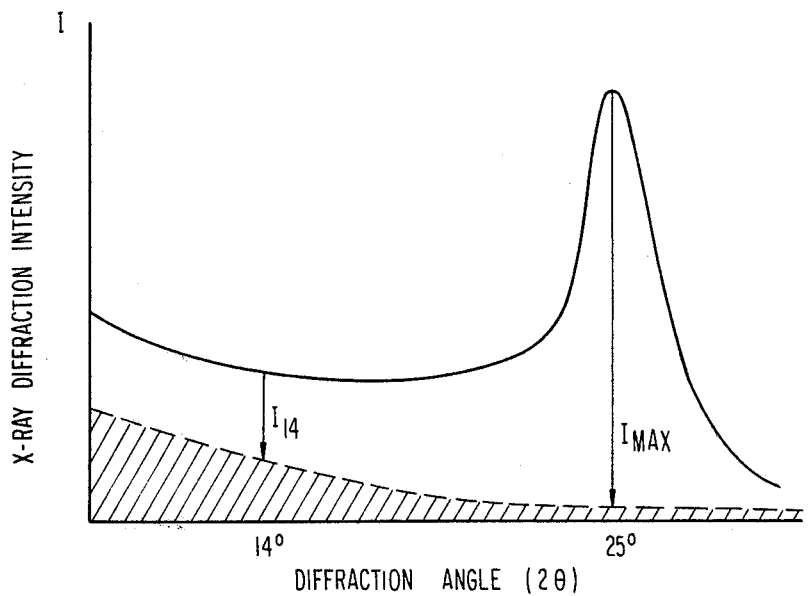
FIG. 1 is a graph which shows an X-ray scattering pattern of carbon of the CFRC obtained in Example 3.

In the relation between an X-ray scattering angle $2\theta$ and a scattering intensity in X-ray wide angle scattering using Cu-K$_\alpha$ X-ray, if the maximum intensity of a peak in the vicinity of $2\theta = 26°$, which corresponds to a face (0 0 2) of a graphite crystal, is indicated by Imax, and the scattering intensity at a scattering angle $2\theta = 14°$ which has no relation to the crystallinity, is indicated by $I_{14}$ (see FIG. 1, the part shown with oblique lines is the scattering intensity due to air.), the crystallinity index R is defined by: $R = I_{max}/I_{14}$; both Imax and $I_{14}$ are compensated with regard to the scattering intensity due to air.

Imax and $I_{14}$ are measured under the X-ray emitting conditions of 35 KV and 15 mA and with an X-ray receiving slit width as 0.5°.

In measuring R of the matrix carbon of CFRC of this invention, only the matrix carbon is taken out from the broken surface of CFRC by use of a needle or the like, and it is measured by the method as described above.

OXIDATION TEMPERATURE $T_o$

A specimen of about 3 mm × 3 mm × 3 mm, weighing about 40 mg is cut off from CFRC and placed on a sample plate of a Thermo Gravimetric Analysis apparatus (for example, a product sold by Rigaku Denki Co. or Perkin Elmer Co.) and the weight reduction is measured while blowing air and heating the specimen at a temperature elevation rate of 10° C./min.

Figure 2:
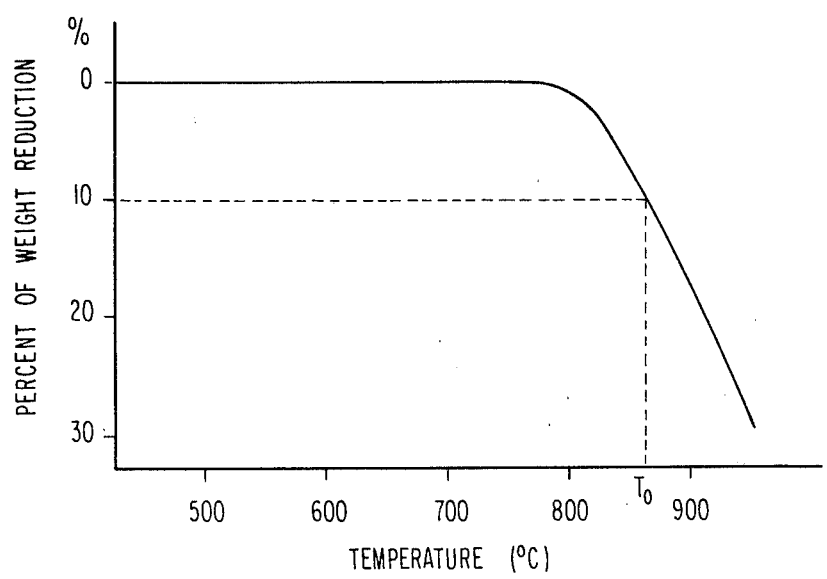
FIG. 2 is a graph which shows a weight-temperature relationship in thermo-gravimetric analysis of the CFRC obtained in Example 3.

An example of the relation between the temperature and the weight reduction is shown in FIG. 2.

Based on FIG. 2, the temperature at which the weight has decreased by 10% from the original weight is measured and is defined as the oxidation temperature $T_o$.

It has been discovered that when the crystallinity index R of the matrix carbon is about 5.0 or less, and the oxidation temperature $T_o$ controlled to a temperature of at least about 800° C. through the anti-oxidation processing of CFRC (which can be seen by comparing Example 1 and Comparative Examples 2 and 4), the abrasion loss suddenly decreases.

Additionally, it has been found that only when R is at least about 2.3 can the oxidation temperature of CFRC be adjusted to a temperature of about 800° C. or more by the anti-oxidation processing according to the invention (see Comparative Example 2), and that where R exceeds about 5.0, even if the oxidation temperature is about 800° C. or more, the mechanical strength, modulus of elasticity and hardenss of matrix carbon decrease and the abrasion loss increases and CFRC suitable as a friction material cannot be obtained (which can be seen by comparing Example 1 and Comparative Example 7). Where R is less than about 2.3, it is not possible to increase the oxidation temperature more than about 800° C. by an anti-oxidation processing, for example, by adding a great larger amount of an antioxidant (see Comparative Example 2).

Briefly, the objects of this invention are attained only when the oxidation temperature is at least about 800° C., preferably at least about 850° C. and R is from about 2.3 to 5.0, preferably from about 2.5 to 4.5.

With conventional CFRC, a heat-treatment at a temperature of more than 2,500° C. has been carried out to effect the graphitization of carbon in the CFRC and, as necessary, an additional oxidation processing has been applied. However, even if the oxidation temperature thereof was more than about 800° C., R would generally be 7 or more, and therefore it is not possible to decrease the abrasion loss to such the extent that can be attained by this invention (see Comparative Examples 7 and 9).

The CFRC of this invention shows significantly superior properties as a friction material compared to materials wherein R is more than 5 and the oxidation temperature is more than about 800° C.; particularly, the abrasion loss is small, and the strength, modulus of elasticity and hardness are high (see Examples 1 to 3).

According to this invention, the high temperature processing which has hitherto been conducted for the purpose of increasing the properties as a friction material, particularly for the reduction in the abrasion loss are not employed. On the contrary, processing at relatively low temperatures is applied, so that R is within a definite range as noted above, and the combination of the relatively low temperature processing and the anti-oxidation processing to increase the oxidation decomposition temperature to a definite level enables the obtainment of a friction material having friction characteristics which are markedly superior to those of the friction materials comprising conventional CFRC.

In general, CFRC is produced as follows:

(1) By a process for producing CFRC which comprises using at least one carbon fiber as a reinforcing fiber, impregnating the reinforcing fiber with a carbonizable resin, molding the thus obtained product and carbonizing the molded product to carbonize the resin, and then impregnating the mold with a carbonizable resin and heating said resin to carbonize the resin, whereby the density of the CFRC is increased.

(2) By a method of depositing carbon on the abovedescribed reinforcing fiber by a chemical vapor deposition method.

(3) A method in which a reinforcing fiber as described above is impregnated with a carbonizable resin, molded and carbonized to carbonize the resin and thereafter the carbonized product is densified by the chemical vapor deposition method.

While any one of the methods as described above may be employed in this invention, any heat-treatment which will increase R to more than about 5.0 should not be applied. Therefore, the temperature at the heat-treatment in this invention is never set to more than 2,400° C. In accordance with this invention, the temperature of the heat-treatment steps is controlled so that R is from about 2.3 to 5.0, or at least one heat-treatment is carried out at a temperature such that R is from about 2.3 to 5.0 between any two steps after the formation of matrix carbon or after the completion of all the steps.

The anti-oxidation treatment of CFRC in this invention is carried out by incorporating at least one antioxidant, for example, phosphorus, boron or compounds thereof in the CFRC.

Examples of phosphorus and boron compounds that can be used include boric acid, phosphoric acid or their metal salts, e.g., calcium salts, zinc salts, phosphoric acid esters such as trimethyl phosphate, etc. Of these compounds, phosphoric acid and boric acid are preferred. Where the metal salt is insoluble in water, it is possible to obtain an aqueous solution of the metal salt to use it in combination with boric acid or phosphoric acid.

For the incorporation of phosphorus, boron or compounds thereof in CFRC, the CFRC is generally impregnated with an aqueous or an organic solvent (in the case of phosphoric acid ester) solution thereof. This impregnation can be easily achieved, since CFRC is porous. By repeating evacuation and application of pressure, the inner portion of CFRC can also be impregnated with the solution. The impregnation may be effected at any stage after the formation of matrix carbon. A suitable concentration of the antioxidant in the solution is from 1% by weight to about 10% by weight. The impregnated solution does not substantially flow out from the CFRC unless a separation procedure, for example centrifugal separation is applied.

After impregnation with the solution, the CFRC is dried. The drying can be carried out at any temperature within the range such that the R value of the matrix carbon does not exceed about 5.0. At this drying step, a temperature may be employed which will provide R of from about 2.3 to 5.0.

Where phosphoric acid and boric acid, which are hygroscopic and exert adverse influences on friction characteristics (friction coefficient and abrasion loss), or organic compounds such as phosphoric acid esters, are employed, the CFRC may be subjected to a further heat-treatment after the impregnation in a non-oxidizing atmosphere such as nitrogen or the like, at a temperature of from about 400° C. to 1,500° C. to convert such compounds to a form in which they exert no adverse influences.

The use of boron, phosphorus, and compounds thereof in combination with antioxidants such as ZnO, $CuSO_4$, $AlCl_3$, $Al(NO_3)_3$, $Ca(OH)_2$, $CaCl_2$ and $CaCO_3$ further increases the effect of the antioxidation treatment.

Although the above compound used as an antioxidant sometimes undergoes a chemical change during the heat-treatment, it is sufficient in this invention that at least one of phosphorus and boron exist in some form in the final product.

Where R is from about 2.3 to 5.0, the effect of the antioxidation treatment is prominent, and $T_o$ can easily be raised to about 800° C. or more and, in some cases, to as high as about 930° C. It is of course preferred to control $T_o$ to be as high as possible.

The amount of the antioxidant required for effecting the anti-oxidation treatment so that the oxidation temperature $T_o$ of CFRC is at least about 800° C. varies, depending upon the processing agent used and the R value of the matrix carbon of the CFRC. Where R is low, an effective anti-oxidation treatment is required to be applied in order to increase $T_o$ to about 800° C. or more, on the other hand where R is near 5, $T_0$ is relatively high without application of any processing and, therefore, $T_0$ can be raised to about 800° C. or more by a less effective anti-oxidation treatment. However, when R is too low, it is not possible to raise $T_0$ to at least about 800° C. or more by any oxidation treatment. This critical point is about 2.3.

Where R is less than about 2.3, it may be raised to more than 2.3 by applying a heat-treatment before or after the anti-oxidation treatment.

The antioxidant content of CFRC which is required in order to raise $T_0$ to at least about 800° C. is generally about 0.02% to about 0.5% by weight expressed in terms of elemental boron and phosphorous content based upon the weight of CFRC. As R is greater, that is, nearer to 5, $T_0$ can be increased to at least about 800° C. using smaller amounts of antioxidant. On the other hand, as R is smaller, that is, nearer to 2.3, it is required to add a large amount, for example, 0.4 to 0.5% by weight of the antioxidant in order to increase $T_0$ to at least about 800° C. Although the antioxidant may be used in amounts greater than 0.5% by weight, no corresponding increase in effect can be observed. In general, it is added in amounts to obtain a content of about 10% by weight or less.

The impregnation treatment as described above permits the nearly uniform introduction of a phosphorous compound and/or a boron compound into the inner portion of CFRC. When the CFRC is used as a friction material, it is not always necessary to uniformly introduce such elements in the inner portion thereof since the effects of this invention can be obtained so long as such elements exist on the surface or near the surface thereof; that is, these elements may be introduced in the amount as described above in the area where is to be exposed after abrasion or in the neighborhood thereof. In the case of such impregnation, it is not necessary to apply the above operation of evacuation and application of pressure.

If $T_0$ is below about 800° C., even if R is about 5.0 or less, a brake material or pantograph which is used at high temperatures in air will be subject to an abrupt increase in abrasion during the use thereof. Additionally, where R is greater than about 5.0, even if $T_0$ is more than about 800° C., the abrasion loss increases, and furthermore the strength, modulus (of elasticity) and hardness of CFRC decrease.

As is apparent from the definition as described previously, the R value of the matrix carbon as used in this invention is a measure indicating the extent of crystallization of matrix carbon R of about 5.0 or less indicates that the carbon is substantially amorphous. In general, carbon undergoes crystallization by heat-treatment at high temperatures, and the ease of crystallization varies depending upon the starting material. Those carbons produced from petroleum fractions, e.g., petroleum pitch and asphalt and obtained by the chemical vapor deposition method easily crystallize and undergo crystallization by heat-treatment at lower temperatures. On the other hand, those carbons obtained from a phenol resin, a furan resin, coal tar or the like crystallize only with difficulty, and a heat-treatment of such carbons at higher temperatures is required in order to produce crystallization. Furthermore, the application of stress during the heat-treatment accelerates the crystallization.

In order to control the R value of the matrix carbon of CFRC to a range from about 2.3 to 5.0, it is necessary to subject the matrix carbon at least once during the production thereof to the heat-treatment at a specific temperature usually for from about 1 minute to about one hour or more. While the temperature at which the heat-treatment is carried out varies depending upon the ease of crystallization of the matrix carbon, in the case of a matrix carbon which crystallizes with ease, it is from about 1,200° C. to 2,100° C., and in the case of a matrix carbon which crystallizes with difficulty, it is from about 1,300° C. to 2,400° C. The choice of a temperature in the range of 1,300° C. to 2,100° C. permits R of any carbonizable resins to be controlled within the range of this invention.

In the practical production of CFRC friction material according to the invention, the conditions under which the heat-treatment and the anti-oxidation processing are carried out should be determined so that the experimentally measured values of R and $T_0$ of the CFRC obtained are, respectively, from abaut 2.3 to 5.0 and about 800° C. or more.

When the temperature at any of the heat-treatments after the formation of matrix carbon exceeds 300° C., the heat-treatment should be carried out in a non-oxidizing atmosphere such as nitrogen.

The order in which the anti-oxidation processing after the carbonization step and the heat-treatment to control R are carried out is not critical. The processing to increase density can be carried out at various times; e.g. before or after the above two treatments or between them. Where the anti-oxidation processing is carried out prior to at least one of the above treatments, drying and the heat-treatment as described above which is applied in order to prevent the reduction in friction characteristics where processed with phosphoric acid, boric acid, or phosphoric acid esters can be omitted.

The method (1) will hereinafter be explained in greater detail.

The reinforcing fiber in the form as described above is impregnated with a carbonizable thermosetting resin, such as a furan resin, a phenol resin or the like and then molded. While the molding conditions vary depending upon the resin, usually the temperature is from about 100° C. to 300° C. and the pressure is from 0 $Kg/cm^2G$ to 100 $Kg/cm^2$ (Gage). After the molding, a preliminary oxidation treatment in air at 200°–350° C. is carried out if an increased yield of carbon at carbonization is desired, and thereafter the heat-treatment is applied in an inert atmosphere at from about 700° C. to 1,500° C., and preferably at from 900° C. to 1,500° C., to effect the carbonization.

The temperature elevation rate can be widely varied, e.g., from 0.1° C./min to 100° C./min, and preferably at from 1° to 10° C./min at a temperature of more than about 200° C. It is maintained at a temperature of 700° C. to 1,500° C. for more than 1 minute, and preferably for more than 10 minutes, and thereafter it is gradually cooled. In general, it is not necessary to maintain it for more than 5 hours at from 700° C. to 1,500° C., but including the time required for the temperature elevation, gradual cooling, etc., it can sometimes be kept much longer, e.g., about 24 hours, at more than 700° C., with almost no adverse influence exerted on R. Depending upon the substance to be carbonized and the temperature R can be controlled to about 2.3 to 5.0 by this heat-treatment step. The thus-obtained CFRC usually has a low density and, therefore, it is impregnated with a carbonizable resin and heated to carbonize the resin, thereby achieving an increase in the density thereof.

Examples of such carbonizable resins include a phenol resin, a furan resin, coal tar, petroleum pitch, asphalt and mixtures thereof. When solid or high viscous materials such as petroleum pitch and asphalt are employed, they are liquified by heating. By repeating the evacuation and application of pressure in a vessel, the impregnation is carried out.

The carbonization is carried out as described above and it can also be carried out at a high pressure of from 10 Kg/cm$^2$ to 1,000 Kg/cm$^2$.

The density of the friction material is generally at least 1.4 g/cm$^3$, and preferably at least 1.5 g/cm$^3$. To obtain such a density, the above step for increasing density is generally repeated more than twice, usually 5 to 10 times. In general, the density can be increased to about 1.8 g/cm$^3$.

The impregnation with an aqueous solution containing an antioxidant is generally carried out at any stage after the first carbonization step. Where no heat-treatment is applied at such a temperature that the R value becomes about 2.3 or more until these steps are completed, a heat-treatment is carried out at any desired stage in order to obtain R value of from 2.3 to 5.0.

The method (2) can be carried out as follows:

The reinforcing fiber is interposed between two plates made, for example, of a carbon material and placed in a furnace, and thereafter it is heated at from 900° C. to 1,500° C. while flowing a hydrocarbon which undergoes pyrolysis and forms carbon, such as methane, ethane, propane, acetylene, benzene, methanol, etc. in combination with a non-oxidizing gas such as nitrogen, argon, hydrogen, etc. whereupon the carbon formed by pyrolysis of the hydrocarbon deposits on the reinforcing fiber. The deposition is carried out until the density of the CFRC reaches at least 1.4 g/cm$^3$. Where the deposited carbon covers the surface and the density does not increase, the surface is subjected to abrasion, and the chemical vapor deposition is again applied, whereby the density increases further.

The method (3) is a combination of the methods (1) and (2) as indicated previously. The operations are as described above.

The friction material of this invention has excellent brake characteristics and is small in abrasion at high temperatures. According to the process of this invention, the heat-treatment is not carried out at high temperatures and, therefore, it is economical and energy-saving.

The following examples are given to illustrate this invention in greater detail.

Although the above explanation and the following examples are mainly directed to the use of the CFRC of this invention as an aircraft brake, it can be used not only as an aircraft brake, i.e., a friction material for a friction element, but also as a friction element, such as a brake material for a train, an automobile, a motor cycle, etc., a pantograph for a train, etc., since when it is used in the air at high temperatures, the oxidation abrasion is small; it is excellent as a friction material.

EXAMPLES 1 TO 3 AND COMPARATIVE EXAMPLES 1 TO 9

Forty one sheets of spun yarn fabrics (290 g/m$^2$) of a carbon fiber (produced by Toho Beslon Co., Ltd.; strength: 300 Kg/mm$^2$; modulus of elasticity: 24 ton/mm$^2$) were impregnated with a phenol resin (Sumilight PR-50273 (registered trade name)), laminated and compressed at 150° C. and at a pressure of 50 Kg/cm$^2$ for 1 hour to obtain a molded product (40×40×1.7 cm) with a fiber content of 40 vol% and a density of 1.18 g/cm$^3$. This mold was raised to 1,000° C. over a period of about 3 hours in an atmosphere of nitrogen, and maintained at 1,000° C. for 1 hour to carbonize the phenol resin, and thereafter it was cooled. Thus, CFRC was obtained.

Since the density of this CFRC decreased to 1.02 g/cm$^3$, it was soaked in coal tar which was placed in a vessel and impregnated with the coal tar by evacuating at a degree of vacuum of 740 mm Hg for 1 hour and then pressurizing at 5 Kg/cm$^2$. Then carbonization was carried out in the same manner as described above. This densification process (i.e., increasing the density by impregnation and carbonization) was carried out ten times until the density reached 1.5 g/cm$^3$.

The thus-obtained material was subjected to the heat-treatment at the temperatures as illustrated in Table 1 in an atmosphere of nitrogen (maintained for 1 hour at temperatures as illustrated in Table 1) and thereafter it was processed to produce a doughnut-like member with a thickness of 1.5 cm, an outer diameter of 390 mm and an inner diameter of 200 mm. This member was then soaked in an aqueous solution of phosphoric acid having the concentrations as illustrated in Table 1, dried at 150° C. and maintained at 700° C. in nitrogen for 60 minutes.

For the thus-obtained CFRC, crystallinity index R, oxidation temperature $T_0$, bending strength and friction characteristics were measured. The results are shown in Table 1.

BRAKE CHARACTERISTIC MEASURING CONDITIONS

The average friction coefficient and the abrasion loss per one stopping (reduction in the thickness of a brake disc) when an inertial force of 320 Kg-m per square centimeters of the friction surface is stopped by a brake surface pressure of 20 Kg/cm$^2$ were measured.

The temperature of the friction material increased to about 1,000° C. due to frictional heat.

TABLE 1

|  | Heat-treatment Temperature (°C.)** | Concentration of Phosphoric Acid (%)* | Phosphorus Content (%) | R | T° (°C.) | Bending Strength (Kg/mm$^2$) | Friction Co-efficient | Abrasion Loss (10$^{-4}$ mm/ stopping) |
|---|---|---|---|---|---|---|---|---|
| Example 1 | 1,600 | 1.0 | 0.061 | 2.8 | 820 | 18.6 | 0.36 | 50 |
| Example 2 | 1,600 | 5.0 | 0.082 | 2.8 | 860 | 18.5 | 0.34 | 16 |
| Example 3 | 2,000 | 5.0 | 0.080 | 4.5 | 870 | 18.0 | 0.37 | 20 |
| Comparative Example 1 | none** | none | 0 | 2.1 | 640 | 14.3 | 0.34 | >1000 |
| Comparative Example 2 | none | 5.0 | 0.084 | 2.1 | 780 | 14.5 | 0.32 | >1000 |
| Comparative Example 3 | 1,600 | none | 0 | 2.8 | 710 | 18.5 | 0.35 | >1000 |
| Comparative Example 4 | 1,600 | 0.5 | 0.0081 | 2.8 | 760 | 18.3 | 0.37 | 800 |
| Comparative Example 5 | 2,000 | none | 0 | 4.5 | 740 | 17.8 | 0.35 | 300 |
| Comparative Example 6 | 2,400 | none | 0 | 7.2 | 770 | 16.5 | 0.33 | 210 |
| Comparative Example 7 | 2,400 | 5.0 | 0.082 | 7.2 | 890 | 16.3 | 0.31 | 85 |
| Comparative Example 8 | 3,000 | none | 0 | 28.8 | 830 | 12.5 | 0.26 | 150 |
| Comparative Example 9 | 3,000 | 5.0 | 0.083 | 28.8 | 920 | 12.8 | 0.28 | 124 |

*"None" in the column of the concentration of phosphoric acid indicates that no anti-oxidation treatment was applied.
**"None" in the column of the Heat-treatment-Temperature means that the maximum heat treatment temperature was 1000° C. (carbonization temperature)

Table 1 clearly indicates that those of the Examples are small in abrasion loss in comparison with those of the Comparative Examples and therefore they are suitable for use as a brake material. That is, it can be seen that the heat-treatment to make be from 2.3 to 5.0 and the anti-oxidation treatment to make $T_0$ at least 800° C. enable to produce an excellent friction material.

EXAMPLES 4 TO 5 AND COMPARATIVE EXAMPLES 10 TO 13

In the same manner as in Example 1 except that as a reinforcing fiber, a filament yarn cloth (370 g/m$^2$) formed from a high strength carbon fiber filament yarn (produced by Toho Beslon Co., Ltd.; strength: 330 Kg/mm$^2$; modulus: 24 ton/mm$^2$; number of filaments: about 6000) or a high modulus carbon fiber (strength: 250 Kg/mm$^2$; modulus: 35 ton/mm$^2$; number of filaments: about 6000) were used, molding, impregnation, and densification procedures were carried out, and, thereafter, at the temperatures as illustrated in Table 2, the same heat-treatment as in Example 1 was applied. An anti-oxidation treatment using a 5% aqueous solution of phosphoric acid was applied in the same manner as in Example 1 in some cases, as indicated in Table 2.

With regard to the R value of the matrix carbon, some of the matrix portion of the obtained CFRC was shaved off and measured. For reference, the R value of the whole CFRC including the reinforcing fiber was also measured, and is shown in Table 2. The R value of the high strength carbon fiber and the high modulus carbon fiber were respectively 2.6 and 16.5.

For the thus-obtained CFRC, the brake test was conducted under the same conditions as in Example 1, and the friction characteristics were measured. The results are shown in Table 2.

TABLE 2

|  | Fiber* | Heat-treatment Temp.(°C.) | Phosphoric Acid Processing | Oxidation Temp.(°C.) | R Whole | R Matrix | Friction Co-efficient | Degree of Abrasion (10$^{-4}$ mm/ stopping) |
|---|---|---|---|---|---|---|---|---|
| Example 4 | HTC | 1,600 | yes | 860 | 3.0 | 2.8 | 0.35 | 48 |
| Example 5 | HMC | " | " | 875 | 8.9 | 2.9 | 0.33 | 25 |
| Comparative Example 10 | HTC | " | no | 710 | 3.0 | 2.8 | 0.34 | >1000 |
| Comparative Example 11 | HMC | " | " | 730 | 8.9 | 2.9 | 0.33 | >1000 |
| Comparative Example 12 | HTC | 3,000 | " | 830 | 30.5 | 27.9 | 0.29 | 450 |
| Comparative Example 13 | HMC | " | " | 830 | 31.8 | 28.5 | 0.27 | 380 |

*1 HTC: High tenacity carbon fiber fabric
HMC: High modulus (of elasticity) carbon fiber fabric By comparing the Examples and Comparative Examples, it can be seen that it is of importance for this invention that the R value of the carbon matrix be 5 or less and that even if a high modulus carbon fiber is used as a reinforcing fiber (in this case, R of the whole CFRC is high), the effect of this invention can be attained by effecting the heat-treatment in such a manner that the R value of the matrix is 5 or less, and the anti-oxidation treatment in such a manner that the oxidation temperature be 800° C. or more.

EXAMPLE 6

Thirty sheets of the same type of carbon fiber spun yarn fabrics as used in Example 1 were impregnated with a furan resin (Hitafuran 502, produced by Hitachi Chemical Co., Ltd.), laminated and compressionmolded by keeping for 30 minutes under the conditions of a temperature of 120° C. and a pressure of 35 Kg/cm² and then for 1 hour under the conditions of a temperature of 200° C. and a pressure of 35 Kg/cm² to obtain a 40×40×1.7 (cm) mold having a fiber content of about 30% by volume and a density of 0.98 g/cm².

The thus-obtained mold was carbonized in the same manner as in Example 1 to obtain CFRC having a density of 0.80 g/cm³.

The impregnation-densification was repeated eleven times in the same manner as in Example 1 except that in the 11th impregnation-densification the heat-treatment temperature was 1800° C. The CFRC was then soaked in a 8% aqueous solution of boric acid. After the evacuation at 650 mm Hg, the pressure was allowed to return to atmospheric pressure. In this way, the CFRC was impregnated with the aqueous solution of boric acid, dried at 140° C. and then treated at 500° C. for 20 minutes in nitrogen.

The density of the thus-obtained CFRC was 1.53, the boron content was 0.048 wt%, $T_o$ was 850° C., and the crystallinity index R of the matrix carbon was 3.3. When measured in the same manner as in Example 1, the friction coefficient was 0.34, and the friction loss was $28 \times 10^{-4}$ mm/stopping.

While the invention has been described in detail and with reference to specific embodiments thereof, it will be apparent to one skilled in the art that various changes and modifications can be made therein without departing from the spirit and scope thereof.

What is claimed is:

1. A carbon fiber reinforced carbon friction element containing matrix carbon and, as a reinforcing fiber, at least one carbon fiber, wherein the crystallinity index R of the matrix carbon is from about 2.3 to 5.0, which carbon fiber reinforced carbon friction element contains an antioxidant in an amount of from about 0.02 to 0.5% by weight of the total weight of the carbon fiber reinforced carbon friction element, wherein the oxidation temperature $T_0$ is at least about 800° C. due to antioxidation processing during the production of the carbon fiber reinforced carbon friction element after the formation of the matrix carbon or after the completion of production thereof by incorporating an antioxidant therein by impregnating a solution of the antioxidant therein, the amount of the antioxidant being sufficient to increase the oxidation temperature $T_0$ of the carbon fiber reinforced carbon to about 800° C. or more, said matrix carbon being subjected to heat-treatment at a temperature of from about 1200° C. to about 2400° C. at least once during the production of the carbon fiber reinforced friction element to control the R value thereof to be in a range of from about 2.3 to 5.0.

2. A carbon fiber reinforced carbon friction element as in claim 1, wherein the reinforcing fiber content is from about 20% to 65% by volume based on the total volume of the element.

3. A carbon fiber reinforced carbon friction element as in claim 1, wherein the antioxidant comprises at least one of phosphorus, boron and compounds thereof.

4. A carbon fiber reinforced carbon friction element as in claim 1, wherein the production of the carbon fiber reinforced carbon element comprises the steps of impregnating the reinforcing fiber with a carbonizable thermosetting resin, molding, calcining to carbonize the thermosetting resin and impregnating the thus obtained element with a carbonizable resin and carbonizing by calcination to thereby increase the density of the carbon fiber reinforced carbon element.

5. A carbon fiber reinforced carbon friction element as in claim 4, wherein the carbonizable thermosetting resin is at least one of a phenol resin and a furan resin.

6. A carbon fiber reinforced carbon friction element as in claim 4, wherein the carbonizable resin used to increase the density is at least one of a phenol resin, a furan resin, a petroleum pitch, coal tar and asphalt.

7. A carbon fiber reinforced carbon friction element as in claim 1, wherein the production of the carbon fiber reinforced carbon element includes a heat-treatment step at from about 1,300° C. to 2,100° C., in a non-oxidizing atmosphere.

8. A carbon fiber reinforced carbon friction element as in claim 6, wherein the carbonizable resin is at least one of a phenol resin, a furan resin and coal tar and the production of the carbon fiber reinforced carbon includes a heat-treatment step at from about 1,300° C. to 2,400° C. in a non-oxidixing atmosphere.

9. A carbon fiber reinforced carbon friction element as in claim 6, wherein the carbonizable resin is at least one of petroleum pitch and asphalt, and the production of the carbon fiber reinforced carbon includes a heat-treatment step at from about 1,200° C. to 2,100° C. in a non-oxidizing atmosphere.

10. A process for producing a carbon fiber reinforced carbon friction element as in claim 1, wherein the carbon fiber reinforced carbon element comprises a reinforcing fiber having carbon deposited thereon by a chemical vapor deposition method.

11. A carbon fiber reinforced carbon friction element as in claim 10, wherein the deposition of carbon on the reinforcing fiber includes a heat-treatment step conducted at from about 1,200° C. to 2,100° C. in a non-oxidizing atmosphere.

12. A carbon fiber reinforced carbon friction element as in claim 1, wherein the production steps comprise impregnating the reinforcing fiber with a carbonizable thermosetting resin, molding, calcining to carbonize the resin, and increasing the density of the calcined product by a chemical vapor deposition method.

13. A carbon fiber reinforced carbon friction element as in claim 1, wherein the production of the carbon fiber reinforced carbon includes a heat-treatment at from about 1,200° C. to 2,100° C. in a non-oxidizing atmosphere.

14. A carbon fiber reinforced carbon friction element as in claim 4, 10 or 12, wherein the production of the carbon fiber reinforced carbon element includes a heat-treatment step whereby R is controlled to from about 2.3 to 5.0 after the first carbonization step.

15. A carbon fiber reinforced carbon friction element as in claim 1, wherein the friction element is a brake for an aircraft, an automobile, a train or a motorcycle.

16. A carbon fiber reinforced carbon friction element as in claim 1, wherein the friction element is a pantograph of a train run by electricity.

17. A carbon fiber reinforced carbon friction element as in claim 14, wherein the step of increasing the density is carried out before the heat-treatment and anti-oxidation processing steps.

18. A carbon fiber reinforced carbon friction element as in claim 14, wherein the step of increasing the density is carried out between the heat-treatment and anti-oxidation processing steps.

19. A carbon fiber reinforced carbon friction element as in claim 14, wherein the step of increasing the density is carried out after the heat-treatment and anti-oxidation processing steps.

20. A carbon fiber reinforced carbon friction element as in claim 1, wherein the reinforcing fiber content is from 25% to 50% by volume based on the total volume of the element.

21. A carbon fiber reinforced carbon friction element as in claim 3, comprising an additional antioxidant selected from the group consisting of ZnO, $CuSO_4$, $AlCl_3$, $Al(NO_3)_3$, $Ca(OH)_2$, $CaCl_2$ and $CaCO_3$.

22. A carbon fiber reinforced carbon friction element as in claim 1, wherein the crystallinity index R is from about 2.5 to 4.5.

23. A carbon fiber reinforced carbon friction element as in claim 1, wherein the oxidation temperature $T_0$ is at least about 850° C.

24. A carbon fiber reinforced carbon friction element as in claim 3, wherein the phosphorus or boron compounds are selected from the group consisting of boric acid, phosphoric acid metal salts thereof and phosphoric acid esters.

25. A carbon fiber reinforced carbon friction element as in claim 3, wherein the phosphorus or boron compounds are selected from the group consisting of calcium and zinc salts of boric acid and phosphoric acid.

26. A carbon fiber reinforced carbon friction element as in claim 3, wherein a phosphorus compound is used which is trimethyl phosphate.

27. A carbon fiber reinforced carbon friction element as in claim 3, wherein said phosphorus or said phosphorus compound is used.

28. A carbon fiber reinforced carbon friction element as in claim 3, wherein said boron or said boron compound is used.

29. A process for producing a carbon fiber reinforced carbon friction element containing matrix carbon, and, as a reinforcing fiber at least one carbon fiber, wherein the matrix carbon is heat-treated at such a temperature that the crystallinity index R of the matrix carbon is from about 2.3–5.0 and antioxidation processing is carried out during the production of the carbon fiber reinforced carbon after the formation of the matrix carbon, or after the completion thereof, by incorporating an antioxidant by impregnating a solution of the antioxidant therein in an amount of from about 0.02 to 0.5% by weight of the total weight of the carbon fiber reinforced friction element, which amount is effective to increase the oxidation temperature $T_0$ of the carbon fiber reinforced carbon to about 800° C. or more.

* * * * *